US007805821B2

(12) United States Patent
Suzuki

(10) Patent No.: US 7,805,821 B2
(45) Date of Patent: Oct. 5, 2010

(54) METHOD OF MAKING CAPACITANCE SENSOR

(75) Inventor: Tamito Suzuki, Fukuroi (JP)

(73) Assignee: Yamaha Corporation, Shizuoka-Ken (JP)

( * ) Notice: Subject to any disclaimer, the term of this patent is extended or adjusted under 35 U.S.C. 154(b) by 0 days.

(21) Appl. No.: 11/841,455

(22) Filed: Aug. 20, 2007

(65) Prior Publication Data

US 2008/0047128 A1 Feb. 28, 2008

(30) Foreign Application Priority Data

Aug. 22, 2006 (JP) ............................. 2006-224978

(51) Int. Cl.
*H01G 7/00* (2006.01)

(52) U.S. Cl. .................... 29/25.41; 29/592.1; 29/25.35; 73/718

(58) Field of Classification Search ..... 29/25.35–25.42, 29/592.1, 594–595, 847, 609.1; 438/49, 438/110, 118, 15; 73/718, 724, 780, 706; 361/283.4, 283.1
See application file for complete search history.

(56) References Cited

U.S. PATENT DOCUMENTS

| | | | | |
|---|---|---|---|---|
| 5,332,469 | A | 7/1994 | Mastrangelo | |
| 5,408,731 | A * | 4/1995 | Berggvist et al. | 29/25.41 |
| 5,801,313 | A * | 9/1998 | Horibata et al. | 73/718 |
| 6,465,271 | B1 * | 10/2002 | Ko et al. | 438/48 |
| 6,877,383 | B2 * | 4/2005 | Horie et al. | 73/754 |
| 7,146,016 | B2 * | 12/2006 | Pedersen | 381/175 |
| 7,400,737 | B2 * | 7/2008 | Pedersen | 381/175 |

FOREIGN PATENT DOCUMENTS

| | | |
|---|---|---|
| JP | 2002-518913 | 6/2002 |
| JP | 2003-031820 | 1/2003 |
| WO | WO-99/65277 | 12/1999 |

* cited by examiner

*Primary Examiner*—Minh Trinh
(74) *Attorney, Agent, or Firm*—Dickstein Shapiro LLP

(57) ABSTRACT

A method for manufacturing a capacitance sensor comprises the steps of (a) depositing a film to be a diaphragm forming a moving electrode, (b) heating the film to be the diaphragm to a first temperature, and (c) depositing a film to be a plate forming a fixed electrode opposing to the moving electrode. Stresses of the diaphragm and the plate of the capacitance sensor are optimized.

8 Claims, 9 Drawing Sheets

METHOD OF MAKING CAPACITANCE SENSOR

CROSS REFERENCE TO RELATED APPLICATION

This application is based on Japanese Patent Application 2006-224978, filed on Aug. 22, 2006, the entire contents of which are incorporated herein by reference.

BACKGROUND OF THE INVENTION

A) Field of the Invention

This invention relates to a capacitance sensor and its manufacturing method.

B) Description of the Related Art

Conventionally, a capacitance sensor used as a pressure sensor and a microphone is well-known. For example, refer to JP 2002-518913. The capacitance sensor has a diaphragm and a plate that function as opposing electrodes of the condenser, converts displacement of the diaphragm corresponding to power added on the diaphragm into an electric signal and outputs the signal. That is, the capacitance sensor is used in a condition that a bias voltage is imposed on and change in capacitance by displacement of the diaphragm is output as voltage change from the capacitance sensor.

By the way, when the diaphragm and the plate are formed by well known doped polycrystalline silicon films, large stress in a direction of stretching is accumulated on the films. However; increase in displacement of the diaphragm corresponding to the power can increase sensitivity, so it is preferable that tension decided by the stress of the diaphragm is small. On the other hand, it is preferable that rigidity of the plate is high in order not to stick the diaphragm to the plate by the electrostatic attraction. The stress of the plate is one of factors to decide the rigidity of the plate.

SUMMARY OF THE INVENTION

It is an object of the present invention to optimize stress of a diaphragm and a plate of a capacitance sensor.

According to one aspect of the present invention, there is provided a method for manufacturing a capacitance sensor, comprising the steps of: (a) depositing a film to be a diaphragm forming a moving electrode; (b) heating the film to be the diaphragm to a first temperature; and (c) depositing a film to be a plate forming a fixed electrode opposing to the moving electrode.

A film formed by deposition includes crystal defects, and this crystal defects bring stress inside the film. Because the crystal defects are recovered by heating, the film stress can be controlled by controlling a film temperature and a heating time. In this manufacturing method, a heating history of the film to be the diaphragm is differentiated from a heating history of the film to be the plate, and the stresses of the diaphragm and the plate are differentiated by that difference in the histories. Therefore, in this manufacturing method, the stress of the diaphragm can be made to be smaller than the stress of the plate.

According to one aspect of the present invention, the method for manufacturing the capacitance sensor may include the step of heating the film to be a diaphragm and the film to be the plate to a second temperature after the step (c).

According to the manufacturing method in the present invention, the stress of the plate can be controlled by heating.

According to the above-described manufacturing method of the capacitance sensor, the second temperature described in the above may be lower than the first temperature described in the above.

The stress of the film becomes smaller as the heating temperature becomes higher in a certain temperature range. According to this manufacturing method, the stress of the plate can be higher than the stress of the diaphragm because a reaching temperature of the plate by the heating process is lower than a reaching temperature of the diaphragm by two heating processes.

The above-described manufacturing method of the capacitance sensor may further comprise the steps of (d) forming a silicon oxide film between the film to be the diaphragm and the film to be the plate; (e) cutting the silicon oxide film into chips; and (f) heating the film to be a diaphragm and the film to be the plate to a second temperature.

When the silicon oxide film is heated to a high temperature, a large compressed stress is accumulated on the silicon oxide film. When the large compressed stress is accumulated on the silicon oxide film formed on the whole surface of a thin and large work, a crack may appear by the compressed stress. According to this manufacturing method, because the silicon oxide film is cut into chips before heating the silicon oxide film between the diaphragms and the plate, such crack can be prevented.

In the manufacturing method, a temperature forming the silicon oxide film may be lower than the first and the second temperatures.

In this case, the stress of the film to be the diaphragm unlikely receives influence by forming the silicon oxide film, and the stress of the film to be the diaphragm can be adjusted by the first temperature and the second temperature.

In the manufacturing method, the film to be the diaphragm and the film to be the plate may be made of same material In the manufacturing method, the film to be the diaphragm and the film to be the plate may be polycrystalline film to which impurities are diffused.

A capacitance sensor with high quality can be manufactured at a low cost by using the polycrystalline silicon film because various film forming methods and controlling methods of film characteristics have been established.

In the manufacturing method, for example, phosphate is used for the above-described impurities.

According to another aspect of the present invention, there is provided a capacitance sensor, comprising: a diaphragm forming a moving electrode made of a deposited film; a plate forming a fixed electrode, opposing to the moving electrode, made of a deposited film, and wherein a stress of the diaphragm and a stress of the plate are adjusted by different heating process histories.

DETAILED DESCRIPTION OF THE PREFERRED EMBODIMENTS

Figure 1:
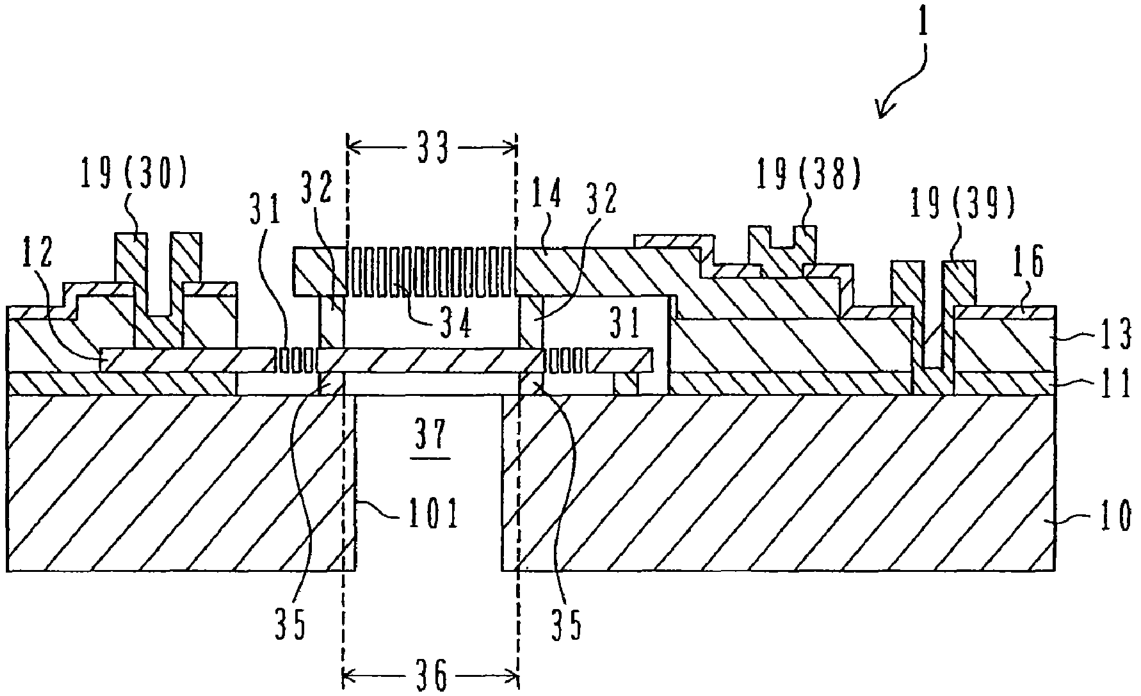
FIG. 1 is a cross sectional view showing a condenser microphone 1 according to an embodiment of the present invention.

FIG. 1 is a cross sectional view showing a condenser microphone 1 according to an embodiment of the present invention. The condenser microphone 1 is composed of function factors with a plurality of thin films laminated by using a semiconductor manufacturing process.

A plate 33 and a diaphragm 36 are formed of conductive films 12 and 14, both films made of polycrystalline silicon to which phosphate is diffused in high density. When a polycrystalline silicon film to which phosphate is diffused in high density is formed, a strong stretching stress (for example, 200 MPa) is accumulated in the film, however; the stretching stress of the diaphragm 36 is adjusted to 20 MPa or less. The stress of the plate 33 is set to approximately 100 MPa that is higher than the stress of the diaphragm 36 with a heating process history that is different from that of the diaphragm 36.

The conductive film 12 is formed on an insulating film 11 made of, for example, a silicon oxide film formed on a substrate 10 made of a single crystalline silicon. An insulating film 13 made of, for example, a silicon oxide film is connected between the conductive film 12 and the conductive film 14. The insulating film 11 and the insulating film 13 are patterned to form a space between a part of the conductive film 12 and a part of the conductive film 14, to stretch a part of the conductive film 12 is stretched between spacers 35 formed of remaining parts of the insulating film 11 and to stretch a part of the conductive film 14 between remaining parts of the insulating film 13. The part of the conductive film 12 stretched between the remaining parts of the insulating film 13 corresponds to the diaphragm 36. In this embodiment of the present invention, the entire vibrating diaphragm 36 forms a moving electrode. However, the moving electrode may be limitedly formed at a certain part of the diaphragm 36. For example, the diaphragm 36 may be formed with plural layers of films including a conductive film and an insulating film. The part of the conductive film 14 stretched between the spacers 32 formed of the remaining parts of the insulating film 13 corresponds to the plate 33. In this embodiment of the present invention, the entire plate 33 opposing to the diaphragm 36 forms a standstill electrode. However, the standstill electrode may be limitedly formed at a part of the plate 33. For example, the plate 33 may be formed with plural layers of films including a conductive film and an insulating film. Plurality of pierced holes 34 for reaching a sound wave to the diaphragm 36 are formed on the plate 33.

An electrode 30 for connecting the diaphragm 36 to an external signal processing circuit is connected to the conductive film 12. An electrode 38 for connecting the plate 33 to the external signal processing circuit is connected to the conductive film 14. An electrode 39 for connecting a substrate 10 to a reference potential terminal is connected to the substrate 10. The electrodes 30, 38 and 39 are, for example, made of aluminum silicon type conductive film 19.

A pierced hole 101 is formed on the substrate 10 directly below the diaphragm 36. An opening of the pierced hole 101 is closed by a mounting substrate. The pierced hole 101 forms a back cavity directly below the diaphragm 36. The back cavity 37 is released to atmosphere via the pierced holes 31 formed on the conductive film 12. The spacers 35 supporting the diaphragm 36 are cut in a perimeter direction of the diaphragm 36, and a path (not shown in the diagram) connecting the back cavity to the atmosphere is formed.

The condenser microphone 1 is fixed on a mounting substrate (not shown in the drawings) and is used in a condition that a bias voltage is imposed on the diaphragm 36 and the plate 33. When a sound wave from the pierced holes 34 reaches the diaphragm 36, the diaphragm 36 vibrates. At this time, because the sound wave that passes through the pierced holes 34 goes to the pierced hole 101 through the pierced holes 31, the plate 33 substantially stands still. That is, the capacitance of the condenser composed of the diaphragm 36 and the plate 33 varies because of the vibration of the diaphragm 36 to the plate 33. This capacitance change is converted to a voltage signal by the external signal process circuit that is connected to the electrodes 30, 38 and 39.

Because the diaphragm 36 is formed of the conductive film 12 of which stress is adjusted to 20 MPa or less, it is stretched to the spacer 35 with a small tension. By decreasing the tension of the diaphragm 36, sensitivity of the condenser microphone 1 will increase.

When the diaphragm 36 approaches to the plate 33, static attraction acting between the diaphragms 36 and the plate 33 increases. At this time, when the plate 33 is attracted to the diaphragm 36 to bend, a pull-in phenomenon adhering the diaphragm 36 to the plate 33 rises. According to the embodiment of the present invention, the stress of the conductive film 14 forming the plate 33 is adjusted to approximately 100 MPa that is larger than the stress of the conductive film 12 forming the diaphragm 36 in order to increase the tension of the plate 33 stretched to the spacer 32. By increasing the tension of the plate 33, pull-in can be prevented.

FIG. 2A to FIG. 8B are cross-sectional views showing an example of the manufacturing method of the condenser microphone 1 according to the embodiment of the present invention.

Figure 2A:
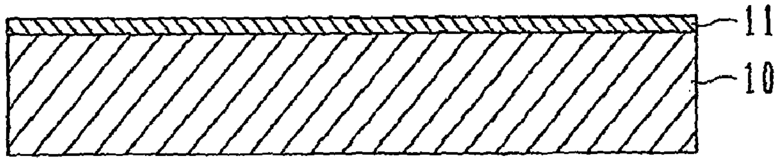
FIG. 2A to FIG. 2D are cross-sectional views showing a manufacturing method of the condenser microphone 1 according to the embodiment.

First, as shown in FIG. 2A, a silicon oxide film as the insulating film 11 are deposited by CVD, etc. on a surface of a single crystalline silicon wafer to be the substrate 10. The insulating film 11 forms the spacers 35 that support the diaphragm 36 and is a film for insulating the conductive film 12 and the substrate 10.

Figure 2B:
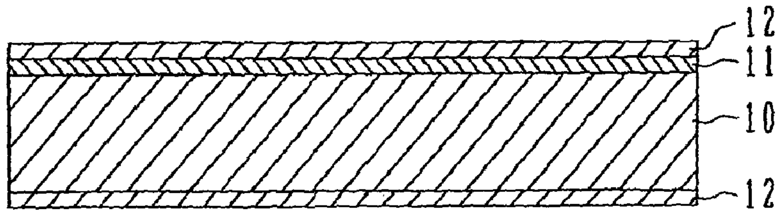

Next, as shown in FIG. 2B, the conductive film 12 to be the diaphragm 36 is deposited with low pressure CVD on the surface of the insulating film 11. As described in the above, the conductive film 12 is, for example, a polycrystalline silicon film to which phosphate is doped in high density. For example, the conductive film is formed by in-situ that brings dopant in the film at the same time of accumulation of the films. Gas (for example, mole ratio of $PH_3/SiH_4$ is 0.155) is used as material. At this time, a strong stretching stress is accumulated on the conductive film 12.

Figure 2C:
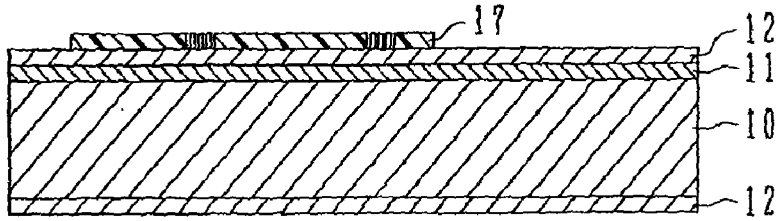

Next, as shown in FIG. 2C, a photo resist mask 17 for patterning the conductive film 12 is formed.

Figure 2D:
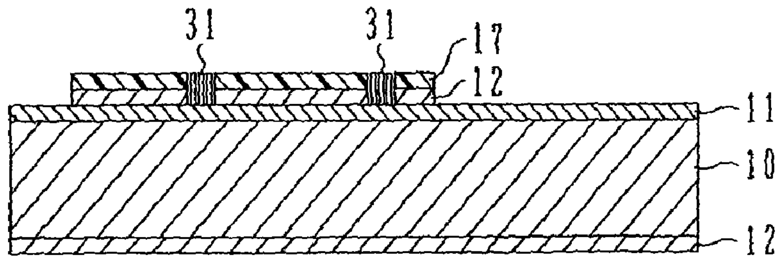

Then, as shown in FIG. 2D, unnecessary parts of the conductive film 12 are removed by dry etching with the photo resist mask 17. As a result, pierced holes 31 of the diaphragm 36 and wiring parts for connecting the diaphragm 36 with the electrodes 30, 38 and 39 are formed.

The conductive film 12 formed by the deposition includes crystal defects, and these crystal defects bring stress inside the conductive film 12. Since the crystal defects are recovered by heating, the stress of the film can be controlled by controlling a film temperature and a heating time.

Figure 3A:
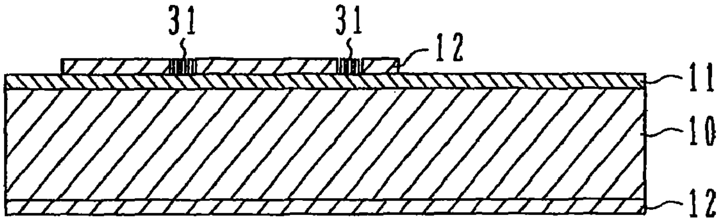
FIG. 3A to FIG. 3D are cross-sectional views showing the manufacturing method according to the embodiment.
Figure 9:
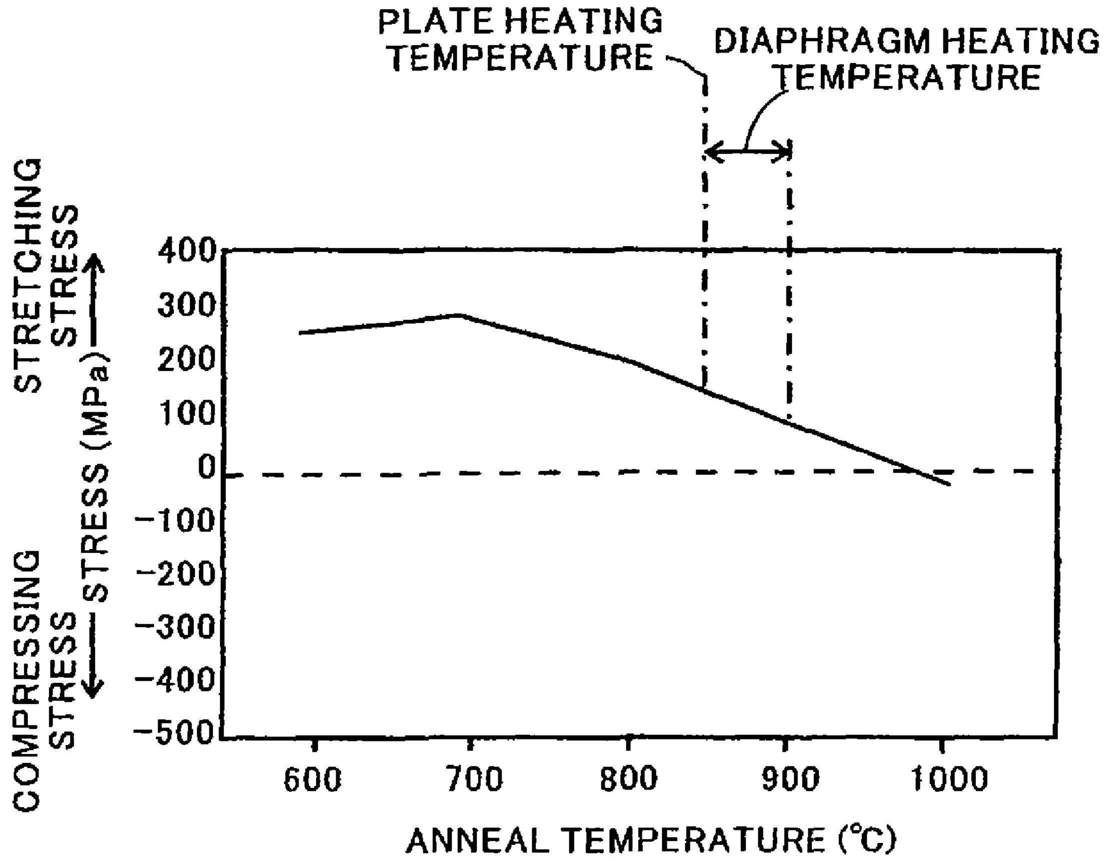
FIG. 9 is a graph showing a relationship between temperatures and stresses according to the embodiment of the present invention.

As shown in FIG. 3A, in a state of removing the photo resist mask, a first heating process for reducing the stress of the conductive film 12 to be the diaphragm 36 is executed. In the first heating process, the stress to remain in the diaphragm 36 is not finally adjusted, and heating condition in order to adjust the stress of the diaphragm 36 is finally set in a second heating process. When the stress to remain in the diaphragm 36 is finally set to approximately 20 MPa, it is necessary to heat the diaphragm 36 to approximately 900-925 degrees centigrade at one time lamp anneal (Refer to FIG. 9). Then, taking the stress reducing by the second heating process into consideration, in this first heating process, for example, the diaphragm 36 is heated for approximately 5 to 15 seconds to 850 to 900 degrees centigrade by the lamp anneal.

Figure 3B:
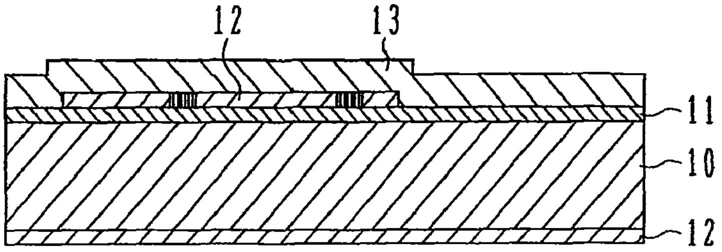

Next, as shown in FIG. 3B, a space is formed, and the insulating film 13 for making a space between the diaphragm 36 and the plate 33 and for insulating the conductive film 12 forming the diaphragm 36 from the conductive film 14 forming the plate 33 is formed on the insulating film 11 covering the conductive film 12. The insulating film 13 is composed of the silicon oxide film as described in the above, and for example, it is formed by CVD used gas with low temperature that does not influence on the stress of the diaphragm 36.

Figure 3C:
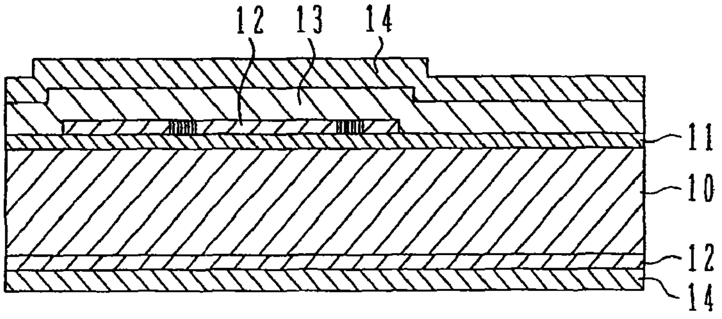

As shown in FIG. 3C, a conductive film 14 to be the plate 33 is deposited a surface of the insulating film 13. As described in the above, for example, the conductive film 14 is a polycrystalline silicon film to which phosphate is diffused in high density. For example, the conductive film 14 is formed by in-situ that brings dopant in the film at the same time of deposition of the films. Gas (for example, mole ratio of $PH_3$/$SiH_4$ is 0.1 to 0.5) is used as a material. At this time, a strong stretching stress is accumulated on the conductive film 14. When order of the mole ratio of $PH_3$/$SiH_4$ is high level of $10^{-1}$ level, effect of stress reduction by the heating process can be expected.

Figure 3D:
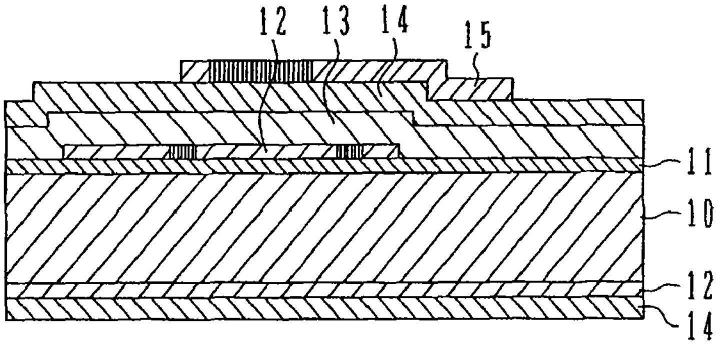

Next, as shown in FIG. 3D, a photo resist mask 15 for patterning the conductive film 14 is formed.

Figure 4A:
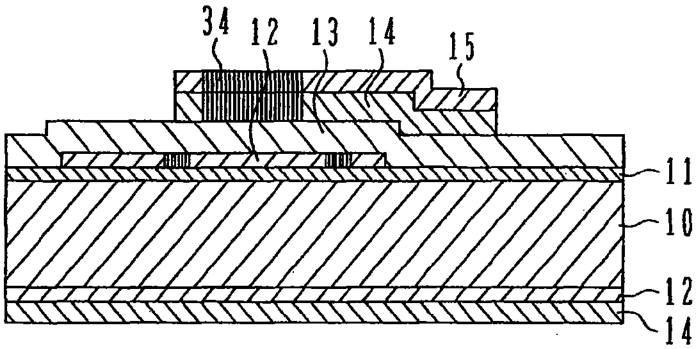
FIG. 4A to FIG. 4D are cross-sectional views showing the manufacturing method according to the embodiment.

Then, as shown in FIG. 4A, unnecessary parts of the conductive film 14 are removed by dry etching with the photo resist mask 15. As a result, pierced holes 34 of the plate 33 and a wiring part for connecting the plate 33 with the electrodes 38 are formed.

Figure 4B:
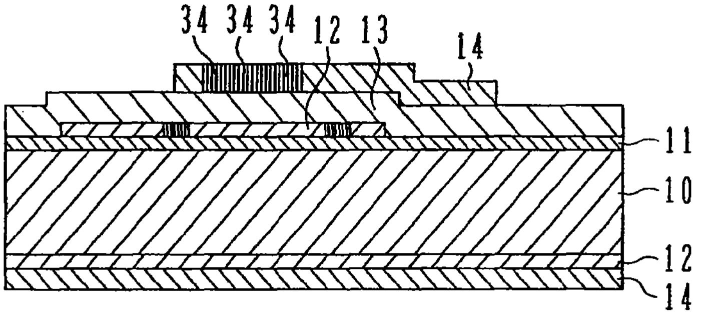

Thereafter, as shown in FIG. 4B, the photo resist mask 15 is removed.

Figure 4C:
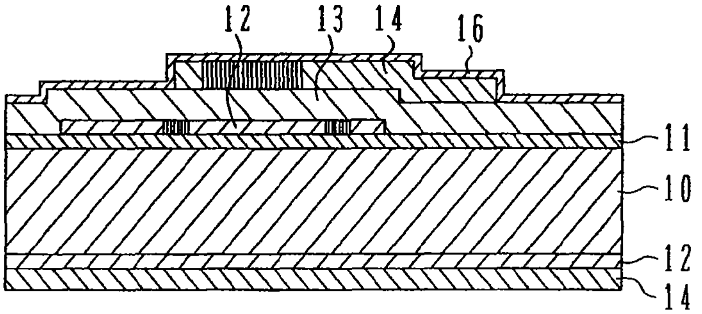

Next, as shown in FIG. 4C, an insulating film 16 covering the silicon oxide film and the conduct film 14 is formed on an entire surface of the work. The insulating film 16 is, for example, formed by CVD using gas at a low temperature that will not influence on the stresses of the plate 33 and the diaphragm 36. For example, the insulating film 16 is formed by a forming method by plasma CVD that can form in an atmosphere of 400 degrees centigrade or less.

Figure 4D:
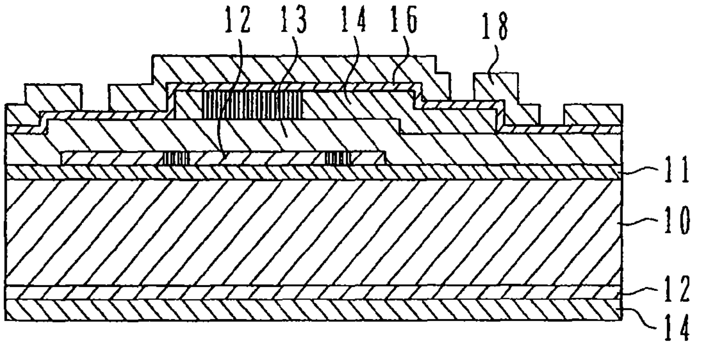

Then, as shown in FIG. 4D, a photo resist mask 18 for patterning the insulating film 16 is formed.

Figure 5A:
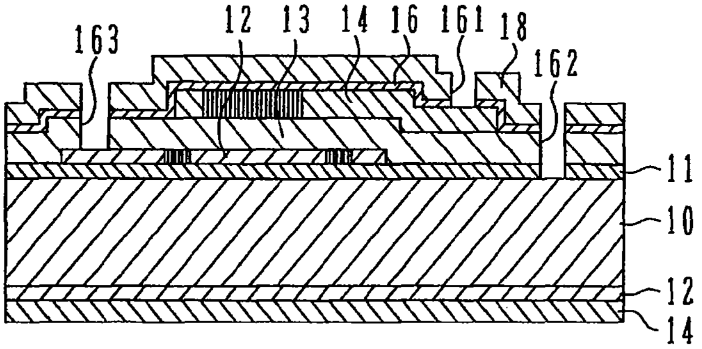
FIG. 5A to FIG. 5D are cross-sectional views showing the manufacturing method according to the embodiment.

Thereafter, as shown in FIG. 5A, connecting holes 163, 161 and 162 for connecting the electrodes 30, 38 and 39 to each of the substrate 10, the conductive film 12 to be the diaphragm 36 and the conductive film 14 to be the plate are formed by wet etching, dry etching or a combination of those with the photo resist mask 18.

Figure 5B:
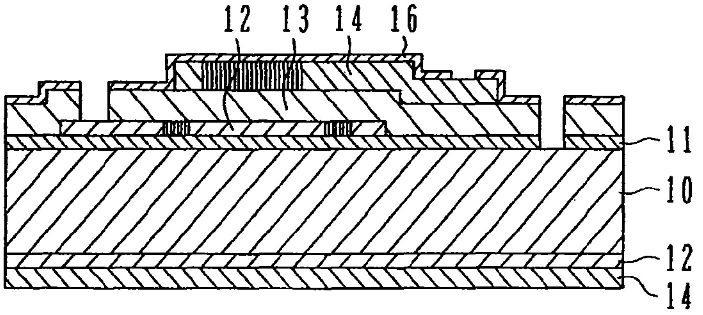

Next, as shown in FIG. 5B, scribe lines (not shown in the drawing) for cutting into chips are formed in a condition that the photo resist mask 18 has been removed. As a result, grooves are formed on the substrate 10, and the insulating films 11, 13 and 16 laminated on the substrate 10 are cut into chips.

The conductive film 14 formed by the deposition includes crystal defects, and these crystal defects bring stress inside the conductive film 14. Since the crystal defects are recovered by heating, the stress of the film can be controlled by controlling a film temperature and a heating time.

After forming the scribe lines, the second heating process is executed before forming the electrodes 30, 38 and 39, and the stresses of the diaphragm 36 and the plate 33 are adjusted. A reason to execute the second heating process at this timing is as follows. When the silicon oxide film is heated to a high temperature, the stress will change from the stretching stress to compressing stress. The first reason is that a crack by the compressing stress may be generated in a condition that the silicon oxide film without a gap covers the entire wafer to be the substrate 10. Moreover, the second reason is that it is impossible to heat to a high temperature after forming the electrodes 30, 38 and 39 when the electrodes 30, 38 and 39 are formed by materials with low fusion point.

In the second heating process, the stress of the diaphragm 36 is adjusted to the final target value, and the stress of the plate 33 is reduced. Since the stress of the plate 33 is higher than that of the diaphragm 36, a lower temperature than the first heating process is applied in the second heating process. For example, the set temperature of the first heating process is 850 to 900 degrees centigrade, and the set temperature of the second heating process is approximately 850 degrees centigrade, and the heating time is set to 5 to 15 seconds. In this temperature setting, the stretching stress of approximately 100 MPa remains in the plate 33, and the stretching stress of approximately 20 MPa remains in the diaphragm 36.

Figure 5C:
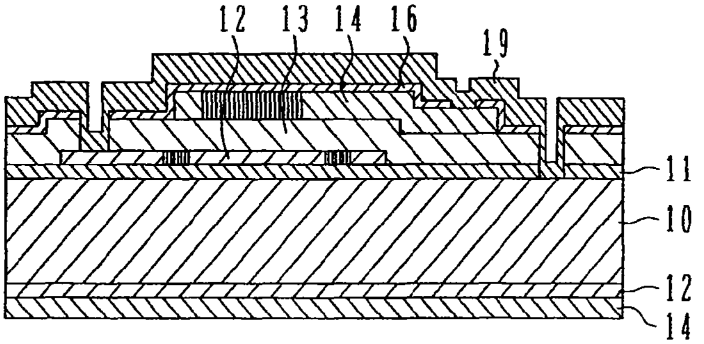

Next, as shown in FIG. 5C, a conductive film 19 for forming the electrodes 30, 38 and 39 is deposited on the entire surface of the work. The conductive film 19 is, for example, a film of aluminum-type as described in the above.

Figure 5D:
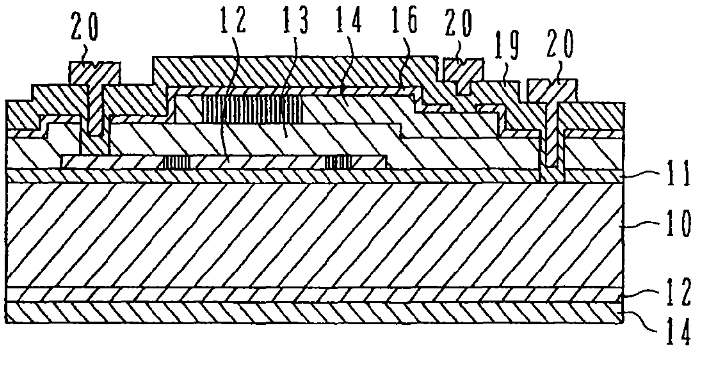

As shown in FIG. 5D, a photo resist mask 20 for patterning the conductive film 19 is formed.

Figure 6A:
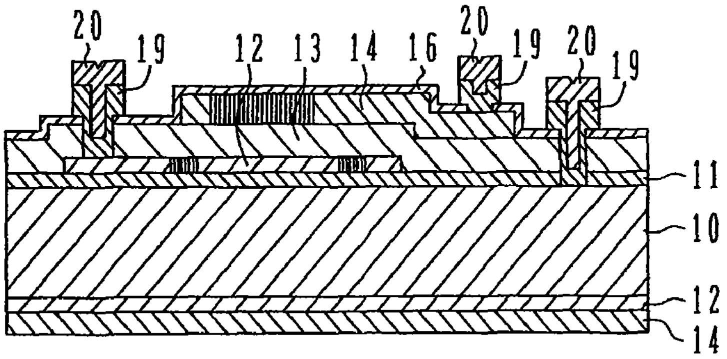
FIG. 6A to FIG. 6D are cross-sectional views showing the manufacturing method according to the embodiment.

As shown in FIG. 6A, unnecessary parts of the conductive film 19 is removed by wet etching with the photo resist mask 20.

Figure 6B:
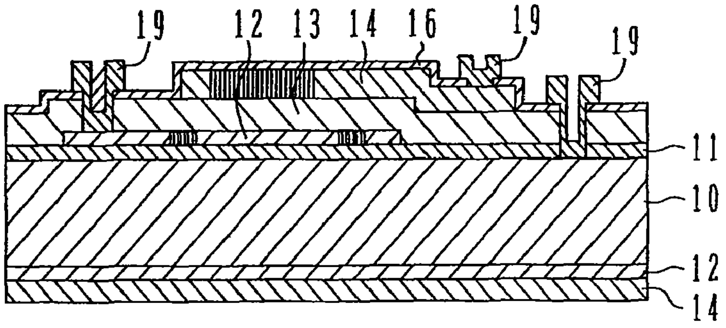

As shown in FIG. 6B, the photo resist mask 20 is removed.

Figure 6C:
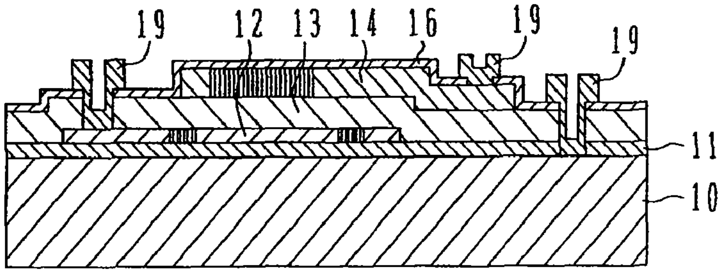

Next, as shown in FIG. 6C, the conductive films 12 and 14 deposited on a reverse side of the substrate 10 are removed by a grinding process.

Figure 6D:
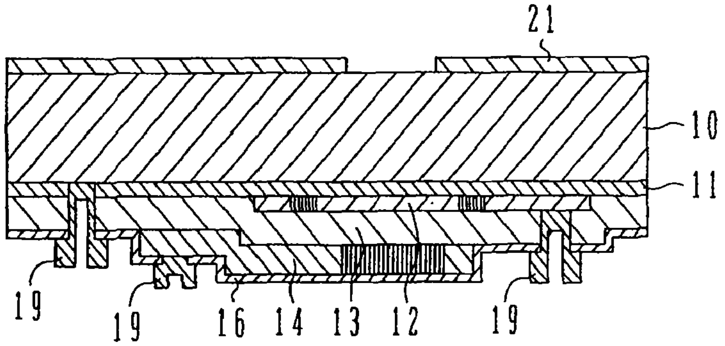

Then, as shown in FIG. 6D, a photo resist mask 21 for forming the pieced hole 101 is formed on the substrate 10.

Figure 7A:
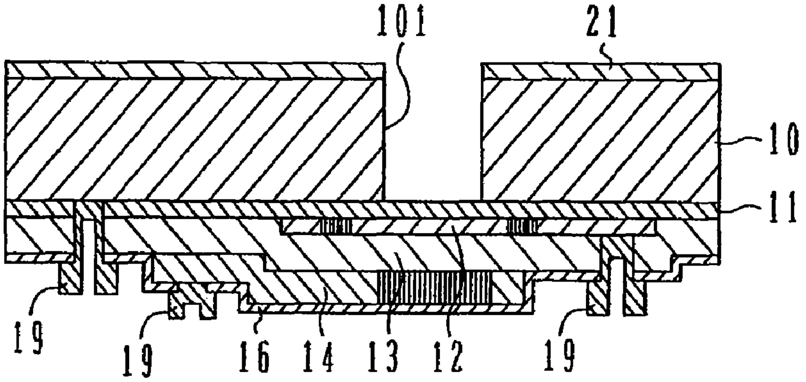
FIG. 7A to FIG. 7C are cross-sectional views showing the manufacturing method according to the embodiment.

After that, as shown in FIG. 7A, the pierced hole 101 is formed on the substrate 10 by anisotropic etching with the photo resist mask 21.

Figure 7B:
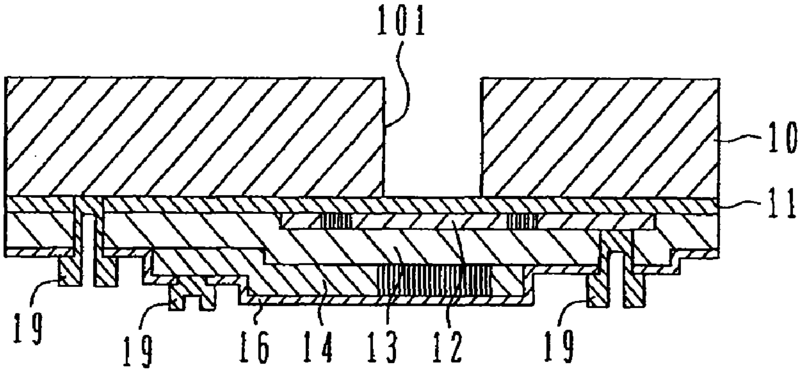

Thereafter, as shown in FIG. 7B, the photo resist mask 21 is removed.

Figure 7C:
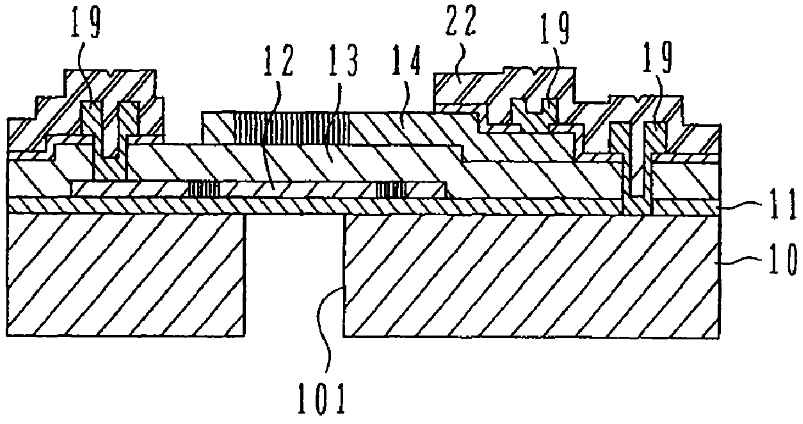

Then, as shown in FIG. 7C, a photo resist mask 22 for patterning the insulating film 16 is formed. After that, a part of the insulating film 13 between the conductive film 14 to be the plate 33 and the conductive film 12 to be the diaphragm 36 is exposed by removing a part of the insulating film 16 by wet etching with the photo resist mask 22.

Figure 8A:
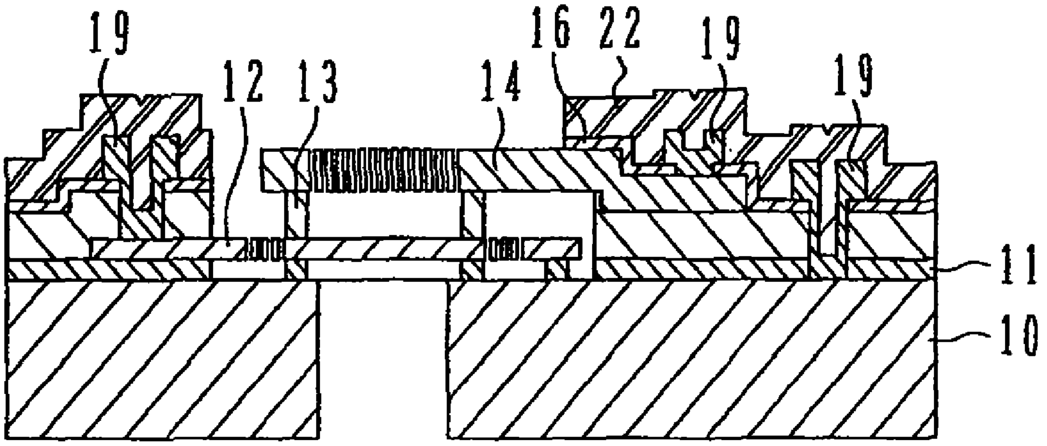
FIG. 8A and FIG. 8B are cross-sectional views showing the manufacturing method according to the embodiment.

Next, as shown in FIG. 8A, an unnecessary part of the insulating film 13 exposing from between the photo resist mask 22 and the conductive film 14 and from the pierced holes 34 and an unnecessary part of the insulating film 11 exposing from the pierced hole 101 are removed by wet etching with buffered hydrofluoric acid. As a result, the spacers 35 and the spacers 32 are formed, and the space is formed between the diaphragm 36 and the plate 33.

Figure 8B:
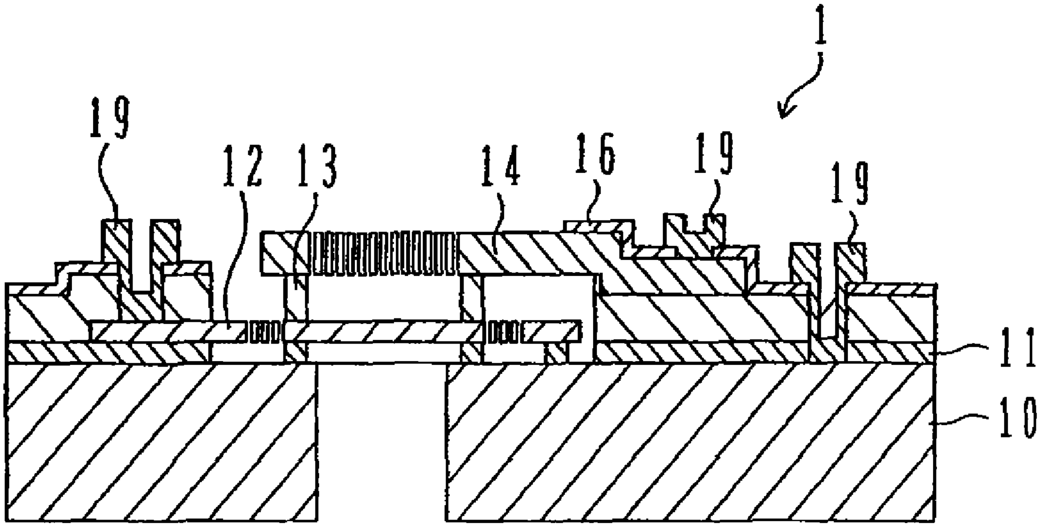

Finally, as shown in FIG. 8B, when the photo resist mask 22 is removed and the substrate 10 is cut along the scribe lines, manufacture of the condenser microphone 1 is completed.

The present invention has been described in connection with the preferred embodiments. The invention is not limited only to the above embodiments. It is apparent that various modifications, improvements, combinations, and the like can be made by those skilled in the art.

For example, the diaphragm 36 and the plate 33 may be composed of material other than the polycrystalline polysilicon such as germanium, carbon or the likes. Moreover, for example, the impurity diffused in the diaphragm 36 and the plate 33 may be boron and arsenic. Moreover, the present invention may be applied, for example, for a pressure sensor, etc. other than a condenser microphone.

What is claimed is:

1. A method for manufacturing a capacitance sensor, comprising the steps of:

(a) depositing a first film to be a diaphragm forming a moving electrode;

(b) heating the first film to a first temperature;

(c) depositing a second film to be a plate forming a fixed electrode opposing to the moving electrode; and (d) after step (c), heating the first film and the second film to a second temperature that is lower than the first temperature.

2. The method for manufacturing a capacitance sensor according to claim 1, further comprising the steps of:

(b1) forming a silicon oxide film between the first film and the second film; and (b2) cutting the silicon oxide film into chips before the heating of step d.

3. The method for manufacturing a capacitance sensor according to claim 2, wherein a temperature forming the silicon oxide film is lower than the first and the second temperatures.

4. The method for manufacturing a capacitance sensor according to claim 1, wherein the first film and the second film are made of same material.

5. The method for manufacturing a capacitance sensor according to claim 1, wherein the first film and the second film are polycrystalline film to which impurities are diffused.

6. The method for manufacturing a capacitance sensor according to claim 5, wherein the impurities are phosphate.

7. The method of manufacturing a capacitance sensor according to claim 1, wherein step (b) reduces a stress of the first film by heating to the first temperature.

8. The method of manufacturing a capacitance sensor according to claim 1, wherein the step (d) reduces a stress of the second film by heating to the second temperature.

* * * * *